April 4, 1967        G. R. DI CRISTINA        3,312,139
ANCHOR BOLT DEVICE SECURING JOINED MEMBERS
Filed Dec. 3, 1964
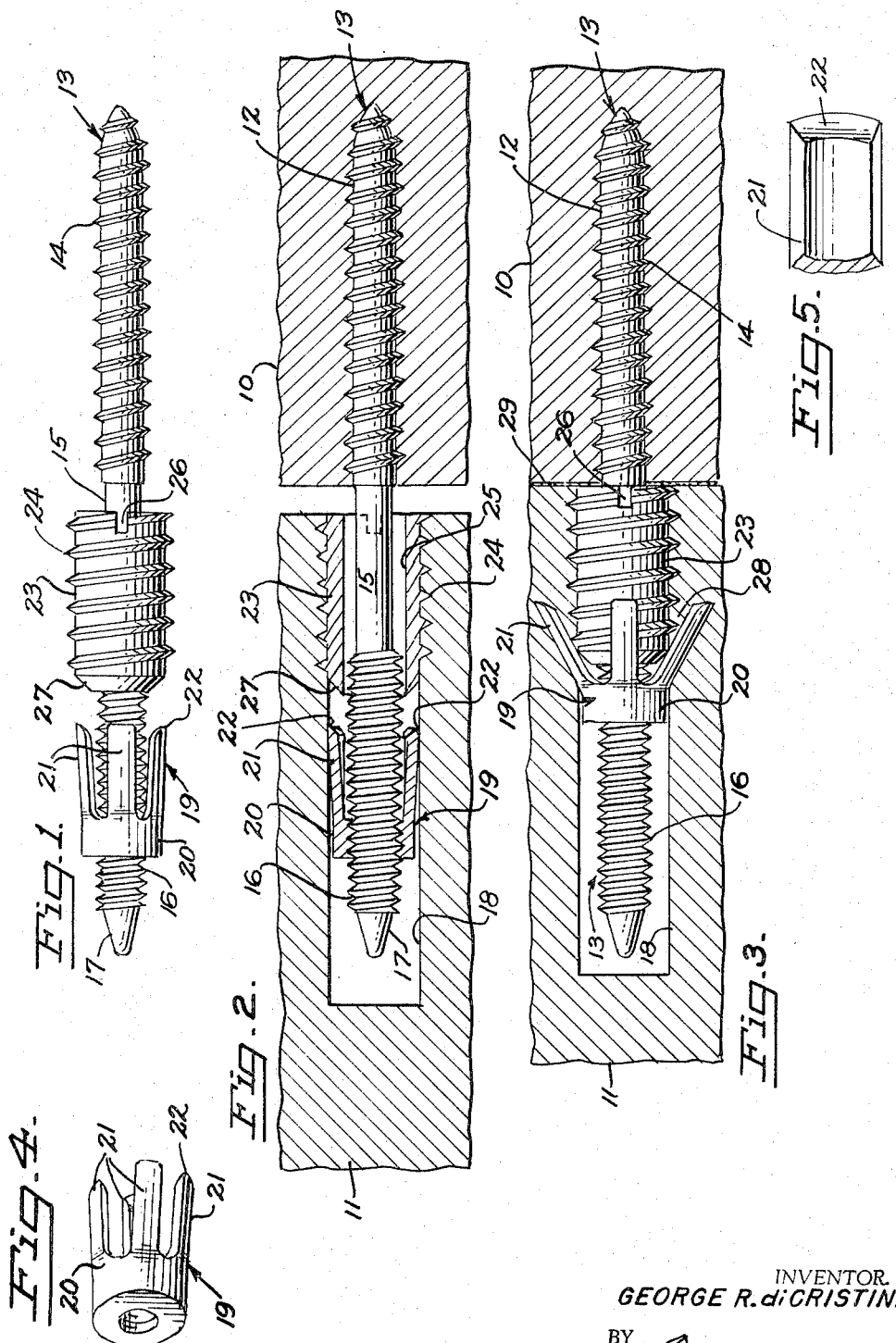
INVENTOR.
GEORGE R. di CRISTINA
BY
ATTORNEY

United States Patent Office 3,312,139
Patented Apr. 4, 1967

3,312,139
ANCHOR BOLT DEVICE SECURING JOINED MEMBERS
George R. di Cristina, 1 Hayward Court, Burlingame, Calif. 94010
Filed Dec. 3, 1964, Ser. No. 415,706
2 Claims. (Cl. 85—74)

This invention relates to mechanical anchor bolt devices for securing joined members, and more particularly relates to anchor bolts having a special adaptability to securing together two pieces of material in face-to-face abutting relation wherein at least one of said pieces is of relatively soft cutable material such as wood, plaster compounds and the like, where a tight substantially imperceptible connecting joint is desired, such, for example, as abutting ends of sections of a wood hand railing for stairs, or in fastening together portions of furniture such as securing table legs to a table top.

Heretofore a prevalent form of such joints provided a bolt having one end portion lag-threaded and the other end portion machine-threaded, with an optional portion between said threaded portions in which no threads are provided. This form of bolt per se may be employed in the present invention, and is so illustrated. In present existing anchors of this general type, the lag-threaded portion of the bolt is tightly or fixedly threaded into one of the members to be joined, and the other or second of the joined members having an axial bore therein into which is received the machine-threaded end portion of the bolt with slidable clearance; and a lateral bore is made in the second joined member preferably at an obscured non-visible part of its body, the lateral bore being in communication with the axial bore, whereupon a suitable machine-threaded anchor nut is inserted into the lateral bore until it is in axial alignment with the threaded portion of the machine-threaded bolt whereupon the nut and machine threaded part of the bolt may be threadedly connected either by use of a special wrench to rotate the nut or by rotation of one of the joined members to draw up the members into a tightly contacting joint, whereupon the laterally drilled hole may be plugged and dressed to a fine finish. It is to be understood that in such a joint, as well as in the use of the present invention, a suitable adhesive may be employed between the abutting faces of joined members, and suitable exterior finishes may be employed in the manner now well known.

It is the object of the present invention to provide a mechanical anchor bolt for joining two members and eliminating the necessity of weakening the joint by a lateral bore in the joint, and thereby avoid necessity for plugging and dressing a lateral cavity in the joint.

A further object is to eliminate outward pressure in the joint and provide an anchor bolt in which the binding pressure of the anchor is forwardly toward the joint and inwardly toward the axial center of one of the joined pieces, and thereby to facilitate joining of pieces of relatively small transverse dimension.

Another object is to provide a wood anchor which bites into the body of one of the wood members of the joint responsive to tightening, and thereby save assembly time by eliminating side openings; and to provide a mechanical anchor means which permits the joined pieces to be shifted slightly after the abutting ends are brought together, without placing an undue strain on the anchor, which would have a tendency to strip the threaded fastening of such an anchor.

With the foregoing and other objects in view, one form in which the invention may be exemplified is described herein and illustrated in the accompanying drawing in which:

FIG. 1 is a longitudinal side view of assembly of bolt structure of the invention;

FIG. 2 is a fragmentary longitudinal section of joined members in spaced relation showing the bolt structure of FIG. 1, partly in section.

FIG. 3 is a fragmentary longitudinal view partly in section, showing bolt member of FIGS. 1 and 2 in locking position.

FIG. 4 is a perspective view of prong-nut member.

FIG. 5 is an enlarged fragmentary perspective view of a prong portion of the prong nut member shown in FIG. 4, the view being of the inner face of the prong.

Referring to the drawings in which like reference characters indicate corresponding parts in the several views, there are provided in the present exemplification two wooden members which may be abutting end portions of handrails for stairways, which are to be connected in face-to-face relation by the anchor device of the invention, such handrail portions being fragmentarily shown and generally indicated 10 and 11, respectively.

The member 10 which may be designated the base member to which the other member is to be connected, may be, and preferably is, a wooden member, though it also may be metal, having a longitudinal general axial bore 12 therein, into which may be threaded one end portion of an integral axially aligned connecting anchor bolt generally indicated 13. Assuming that both members to be joined are of wood material, as exemplified, one end portion of the bolt 13 may be lag-threaded 14, as shown in FIGS. 1 to 3 of the drawings. If, however, the connected base member 10 should be metal to which it was desired to connect a wooden member, the thread 14 in that event may be tapped into the bore 12 of member 10. It may be stated that this bolt having lag-thread at one end portion and machine thread at the opposite end portion is per se conventional, and well known. By way of example, and not as a limitation, one form of conventional commercial bolt structure has the lag-thread 14 for approximately two inches at one end, a blank longitudinal central portion 15 for approximately one inch and a machine-thread 16 at its opposite end portion for approximately one-and-one-half inches, and terminating at said latter end in a conical point portion 17 which is an advantage in leading the bolt and machine thread into a machine-threaded nut, and such conical point portion serves a somewhat similar purpose in the present invention.

The other member 11 is provided with a generally longitudinal axial socket bore 18 in its face which is to be joined, the bore 18 being of a suitable length to receive the bolt portions 15, 16 and the conical point 17 plus a reasonable operating surplus or marginal length.

The bore 18 is of greater transverse diameter than the bore 12, and is of sufficiently greater diameter than the machine-threaded end portion 16 of bolt 13 whereby a generally cylindrical tubular prong-nut generally indicated 19 may be threadedly mounted within the bore 18 upon the machine-thread 16. The prong nut 19 is elongated and is slidable in bore 18, and comprises an internally threaded and externally annular prong nut portion 20 at one of its ends, from which there extends axially a plurality of integral relatively annularly spaced axially elongated straightly aligned prongs 21 each of which is transversely annularly arcuate conformable to the arc of said annular nut portion as best shown in FIG. 5. As shown in FIG. 3 the prongs are stiffly bendable at their connection to the prong nut due to the leverage of their length, but are very resistant to bending intermediate the length thereof due to their transversely annular arcuate form. The prongs preferably are four in number and circumferentially relatively spaced at 90 degrees, each prong being of a uniform annular width throughout the length of the prong whereby the opposite lateral side edges of the respective prongs are straight and parallel, and a relatively wide space is provided between the prongs. These prongs collectively are preferably of substantially the same outer diameter as the prong nut, but they may be initially bent slightly radially outward of the connection to the annular nut portion so as to frictionally engage the wall of bore 18 sufficiently to prevent free sliding. Each of the prongs 21 is transversely arcuate conformable to the annular tubular form of the prong-nut and is provided at its free terminal end with a transversely arcuate sharp gouge chisel blade 22 which is of an arcuate annular width equal to the annular transverse width of the prong whereby the incision made by cutting edge 22 of the prong is equal to said annular width of the prong, whereby the prongs do not have a substantially great lateral pressure and frictional resistance against the side walls of the holes cut by the blades 22, the said chisel blade 22 being chamfered radially inwardly and towards the opposite end of the nut, so that when the blade cuts into the surrounding wall of bore 18, as hereinafter described, the cutting pressure of the sharpened edge of the gouge cutting blade will be inwardly although the pressure of the prong per se is directed outwardly by the bevel of a sleeve, to be described.

Intermediate the prong-nut 19 and the open end of the bore 18 there is mounted in the bore 18 a tubular cylindrical guide sleeve 23 of a diameter to closely or snugly fit the bore 18 and which is externally threaded at 24 for a secure tight threaded mounting within bore 18 at the open end portion of the bore, one end of the sleeve preferably being flush with the adjacent open end of the socket bore 18.

A tubular opening 25 is provided axially longitudinally of the guide sleeve 23, the tubular opening being of a diameter to freely and slidably receive therethrough the machine threaded portion 16 and the plain portion 15 of the bolt 13. At its end adjacent the opening of bore 18 the sleeve may be provided with a kerf 26 whereby it may more easily be screwed into the bore responsive to thread 24. The opposite end of the sleeve 23, that is, the end more adjacent to the prong-nut, has an annular bevel 27 which is circumferential of the opening 25, the bevel incline being outwardly and toward the opposite end of the sleeve whereby it is complemental to the bevel of blades 22 and of prongs 21.

The operation of the invention may be briefly described.

In assembly and operation, after suitable bores 12 and 18 have been made in respective joining members 10 and 11, the lag-threaded portion 14 of the bolt 13 may be securely threaded into the bore 12, the plain portion 15 and machine-threaded portion 16 of the bolt extending free from the end of member 10. The threaded and pronged nut 19 is then inserted with a frictional holding for a suitable distance into the bore 18, at a somewhat greater distance than the length of the sleeve 23, but less than the entire freely extended machine-threaded end portion of the bolt. The prong-nut will be resistantly and slidably supported in such position by friction of the radially spread prongs 21 against the side walls of the bore 18. The prongs will extend from the annular threaded portion of the prong-nut toward the opening of the bore and toward the bevelled end of the sleeve, as will be described.

The tubular sleeve member 23 may then be threadedly inserted into the open end of bore 18, bevelled end first or toward the prong-nut, preferably until the kerfed end is flush with the adjacent end of the opening of the bore, or it may be inserted somewhat farther, so long as the kerf is readily adaptable for rotating the threaded sleeve. Since the tubular bore through the sleeve is of greater diameter than the machine thread and plain portions 15, 16 of bolt 13, it will be understood that the bolt may readily slide through the sleeve, whereupon the machine threads 16 are led by the conical point 17 into threaded engagement with the internal threads of the annular portion 20 of the frictionally held prong-nut 19. Upon suitable rotation of one of the members 10, 11, which rotates the bolt 13 relative to member 11 and the included tubular sleeve 23 and threaded prong-nut 21, the sharpened free terminal blade ends 22 of the prongs are drawn by machine thread 16 into contact with the bevelled end 27 of the sleeve. When the bevelled blade ends 22 of the prongs contact the complementally bevelled end face 27 of the sleeve, the continued relative rotation of threads 16 in nut portion 20, or of one of the members 10, 11 relative to the other spreads the freely extended portion of the prongs 21 radially. Thus, by drawing up of the machine thread 16, the arcuate sharpened prong ends at blades 22 and the arcuate prong portion of the prong-nut bend radially outwardly at the base of the prongs and cut into the sidewalls of the bore 18, and thereby form a wedge of the material of the wall portion of the bore in between the prongs and the walls of sleeve 23, as indicated 28. But since the pressure of the prongs is inwardly toward the axis of the sleeve, the danger of splitting the joined member 11 is eliminated and the anchor may therefore be employed to join relatively small members. In this connection and operation it is to be noted that the transverse arc of the prongs acts as a truss against bending of the prongs intermediate the ends of the prongs whereas the leverage of the length of the elongated prongs from blades 22 to the base connection at the annular nut portion 20 permits the prongs to bend at said connection while maintaining a straight stiff elongated prong body for cutting into the body of the member 11, as shown in FIG. 3.

When the connected members 10 and 11 have a particular complementally mating end-to-end opposed profile, it may be that the opposed end faces would not exactly match relatively when the opposed ends are brought together in superficial contact. But the machine threads 16 are of a very low pitch and therefore the distance of a single rotation is practically inconsequential, and may be taken up if necessary by a layer of adhesive 29 which in any event is usually employed between the opposing faces, after which the exterior of the joint may be finally dressed as is usual.

Having described the invention, I claim:

1. An anchor bolt device for joining together in face-to-face relation a pair of members at least one of which is sufficiently soft to be cutable, said anchor bolt device comprising an axially aligned elongated bolt having a first threaded part at one end portion of the bolt for tight threaded engagement by one of the members to be joined, an integral second bolt portion which is elongated and threaded at the opposite end portion of the bolt, an elongated prong nut threadedly mounted rotatively on said second threaded portion of the bolt, said prong nut having at one end a tubular externally annular and internally threaded nut portion, said annular nut portion having straightly aligned elongated stiffly bendable prongs integrally extended therefrom towards said first bolt portion, said respective prongs having uniform width and being individually and collectively annularly arcuate conformable to the annular arc of said nut portion, the prongs being relatively spaced annularly at said annular nut portion and having at the free ends thereof annularly arcuate cutter blades of substantially the same annular width as the annular width of the prongs, the said prongs being reinforced against bending intermediate the ends thereof by the transverse arc thereof and being bendable at the connection to said annular nut responsive to leverage of the length of the prongs, the said prongs having a chamfered transversely arcuate bevelled cutting edge at the free terminal end, an externally threaded tubular annular sleeve adapted for mounting slidably longitudinally of said bolt between the free end of the prongs and said first portion of the bolt, said sleeve being adapted for threadedly mounting in a bore in a second member to be joined and having its end which is more nearly adjacent to said prong nut beveled radially outwardly and toward the opposite end of the sleeve, said prong nut and the prongs thereof being threadably advanceable toward said sleeve by relative axial rotation of said nut and said second threaded portion of the bolt, whereby the free arcuate sharpened blade ends and the elongated straight portion of the annularly spaced prongs may contact the bevel of the sleeve and be thereby spread radially outward by bending at the connection with the annular nut portion while maintaining the elongated freely extended portion of the prong body aligned straight responsive to the rigidity of the annular arcuate form of the prong.

2. An anchor bolt device as set forth in claim 1, the arcuate chisel cutting blades at the free ends of the respective prongs being inclined radially inwardly from the free end edge of the prongs toward the threaded annular nut portion of the prongs.

References Cited by the Examiner
UNITED STATES PATENTS

| | | | |
|---|---|---|---|
| 703,796 | 7/1902 | Lakhovsky | 85—73 |
| 1,126,531 | 1/1915 | Liebmann | 85—42 |

FOREIGN PATENTS

| | | |
|---|---|---|
| 231,676 | 2/1964 | Austria. |
| 838,577 | 12/1938 | France. |
| 1,365,943 | 5/1964 | France. |
| 1,137,197 | 9/1962 | Germany. |
| 343,992 | 3/1931 | Great Britain. |
| 527,825 | 6/1955 | Italy. |

CARL W. TOMLIN, *Primary Examiner.*

M. PARSONS, JR., *Assistant Examiner.*